(12) United States Patent  
Parker et al.

(10) Patent No.: US 10,015,215 B2  
(45) Date of Patent: Jul. 3, 2018

(54) INTEGRATED COLLABORATIVE USER INTERFACE FOR A DOCUMENT EDITOR PROGRAM

(71) Applicant: Microsoft Technology Licensing, LLC, Redmond, WA (US)

(72) Inventors: Jared R. Parker, Bothell, WA (US); Sangya Singh, Bellevue, WA (US); Greg Prickril, Bethany, OK (US); Wai Chan, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 265 days.

(21) Appl. No.: 14/606,009

(22) Filed: Jan. 26, 2015

(65) Prior Publication Data

US 2015/0143263 A1    May 21, 2015

Related U.S. Application Data

(63) Continuation of application No. 13/098,156, filed on Apr. 29, 2011, now Pat. No. 8,943,417, which is a continuation of application No. 11/824,560, filed on Jun. 29, 2007, now Pat. No. 7,937,663.

(51) Int. Cl.
| | |
|---|---|
| *G06F 3/00* | (2006.01) |
| *H04L 29/06* | (2006.01) |
| *G06F 3/0483* | (2013.01) |
| *G06F 3/0484* | (2013.01) |

(52) U.S. Cl.
CPC .......... *H04L 65/403* (2013.01); *G06F 3/0483* (2013.01); *G06F 3/0484* (2013.01)

(58) Field of Classification Search
CPC ........................................ G06F 3/0481–3/0489  
See application file for complete search history.

(56) References Cited

U.S. PATENT DOCUMENTS

| | | | |
|---|---|---|---|
| 5,339,388 A | * | 8/1994 | Bates .................. G06F 3/04812 715/742 |
| 5,515,491 A | | 5/1996 | Bates et al. |
| 5,671,428 A | | 9/1997 | Muranaga et al. |
| 5,787,175 A | | 7/1998 | Carter |

(Continued)

FOREIGN PATENT DOCUMENTS

| | | |
|---|---|---|
| EP | 1 462 951 A1 | 9/2004 |
| TW | 200627221 A | 8/2006 |

OTHER PUBLICATIONS

Bordin Sapsomboon, et al.; "Software to Aid Collaboration: Focus on Collaborative Authoring"; dated Jan. 31, 1997 (http://www.sis.pitt.edu/~spring/cas/cas.html).

(Continued)

*Primary Examiner* — Steven B Theriault  
(74) *Attorney, Agent, or Firm* — Merchant & Gould

(57) ABSTRACT

An integrated collaborative user interface for a document editor is provided. The integrated collaborative user interface includes a document pane, document details pane and a section details pane. Document details and section details are obtained and provided to authors. A collaborative author views the document details, section details and provides updates to a document in the document editor. Changes are then refreshed to the authors to provide a consistent and up-to-date status of the document.

20 Claims, 17 Drawing Sheets

(56) References Cited

U.S. PATENT DOCUMENTS

| | | | |
|---|---|---|---|
| 5,889,946 A | 3/1999 | FitzPatrick et al. | |
| 5,890,177 A | 3/1999 | Moody et al. | |
| 5,953,733 A | 9/1999 | Langford-Wilson | |
| 5,966,512 A * | 10/1999 | Bates | G06F 17/2288 709/201 |
| 5,970,505 A | 10/1999 | Ebrahim | |
| 6,049,334 A * | 4/2000 | Bates | G06F 3/0481 715/745 |
| 6,055,551 A | 4/2000 | Heinlein et al. | |
| 6,065,026 A | 5/2000 | Cornelia et al. | |
| 6,067,551 A | 5/2000 | Brown et al. | |
| 6,088,702 A | 7/2000 | Plantz et al. | |
| 6,091,930 A | 7/2000 | Mortimer et al. | |
| 6,161,114 A | 12/2000 | King et al. | |
| 6,199,116 B1 | 3/2001 | May et al. | |
| 6,377,947 B1 | 4/2002 | Evans | |
| 6,446,093 B2 | 9/2002 | Tabuchi | |
| 6,601,087 B1 | 7/2003 | Zhu et al. | |
| 6,662,210 B1 * | 12/2003 | Carleton | G06F 3/0481 709/204 |
| 6,826,727 B1 | 11/2004 | Mohr et al. | |
| 6,859,909 B1 | 2/2005 | Lerner et al. | |
| 6,950,852 B1 * | 9/2005 | Kobayaghi | H04L 29/06 709/204 |
| 7,007,232 B1 | 2/2006 | Ross et al. | |
| 7,124,362 B2 * | 10/2006 | Tischer | G06F 17/2247 715/234 |
| 7,139,800 B2 | 11/2006 | Bellotti et al. | |
| 7,139,977 B1 | 11/2006 | Russell | |
| 7,191,410 B1 | 3/2007 | Kruempelmann et al. | |
| 7,249,314 B2 | 7/2007 | Walker et al. | |
| 7,257,769 B2 | 8/2007 | Caspi | |
| 7,263,655 B1 | 8/2007 | Carden, Jr. | |
| 7,325,193 B2 | 1/2008 | Edd et al. | |
| 7,346,656 B2 | 3/2008 | Worthen | |
| 7,409,633 B2 | 8/2008 | Lerner et al. | |
| 7,437,421 B2 | 10/2008 | Bhogal et al. | |
| 7,496,841 B2 | 2/2009 | Hadfield et al. | |
| 7,506,246 B2 | 3/2009 | Hollander et al. | |
| 7,577,906 B2 | 8/2009 | Friedrichowitz et al. | |
| 7,587,695 B2 | 9/2009 | Petunin et al. | |
| 7,679,774 B2 | 3/2010 | Petz | |
| 7,689,921 B2 | 3/2010 | Rajarajan et al. | |
| 7,721,201 B2 | 5/2010 | Grigoriadis et al. | |
| 7,779,347 B2 * | 8/2010 | Christiansen | G06F 17/241 715/230 |
| 7,810,027 B2 | 10/2010 | Bendik | |
| 7,877,460 B1 * | 1/2011 | Brouwer | G06Q 10/10 709/205 |
| 7,930,316 B2 | 4/2011 | Muller et al. | |
| 7,933,956 B2 | 4/2011 | Hon et al. | |
| 7,937,663 B2 | 5/2011 | Parker et al. | |
| 7,941,399 B2 | 5/2011 | Bailor et al. | |
| 7,945,852 B1 | 5/2011 | Pilskains | |
| 7,949,990 B2 | 5/2011 | Pfeil et al. | |
| 7,954,043 B2 | 5/2011 | Bera | |
| 8,046,696 B2 | 10/2011 | Bales et al. | |
| 8,060,887 B2 * | 11/2011 | Kropivny | H04L 67/38 709/204 |
| 8,086,960 B1 * | 12/2011 | Gopalakrishna | G06F 17/30896 715/234 |
| 8,122,367 B2 | 2/2012 | Krieger et al. | |
| 8,182,270 B2 | 5/2012 | Elzinga et al. | |
| 8,196,029 B1 | 6/2012 | Rucker et al. | |
| 8,245,133 B2 | 8/2012 | Grigoriadis et al. | |
| 8,255,818 B2 | 8/2012 | Bales et al. | |
| 8,325,784 B2 | 12/2012 | Konishi et al. | |
| 8,352,870 B2 * | 1/2013 | Bailor | G06Q 10/10 715/230 |
| 8,392,962 B2 | 3/2013 | Grason et al. | |
| 8,417,666 B2 | 4/2013 | Bailor et al. | |
| 8,825,758 B2 * | 9/2014 | Bailor | G06F 17/30168 709/204 |
| 2001/0001864 A1 | 5/2001 | Page et al. | |
| 2001/0042098 A1 | 11/2001 | Gupta et al. | |
| 2002/0049786 A1 | 4/2002 | Bibliowicz et al. | |
| 2002/0078088 A1 * | 6/2002 | Kuruoglu | G06F 17/241 715/232 |
| 2002/0129106 A1 | 9/2002 | Gutfreund | |
| 2003/0051214 A1 | 3/2003 | Graham et al. | |
| 2003/0112273 A1 | 6/2003 | Hadfield et al. | |
| 2003/0179230 A1 * | 9/2003 | Seidman | G06F 3/1454 715/750 |
| 2003/0196164 A1 | 10/2003 | Gupta et al. | |
| 2003/0220905 A1 | 11/2003 | Amado et al. | |
| 2004/0024890 A1 | 2/2004 | Baek et al. | |
| 2004/0044648 A1 | 3/2004 | Anfindsen et al. | |
| 2004/0085354 A1 | 5/2004 | Massand | |
| 2004/0107224 A1 | 6/2004 | Bera | |
| 2004/0122898 A1 * | 6/2004 | Srinivasa | G06F 17/241 709/205 |
| 2004/0189694 A1 | 9/2004 | Kurtz et al. | |
| 2004/0205653 A1 | 10/2004 | Hadfield et al. | |
| 2004/0230658 A1 | 11/2004 | Estrada et al. | |
| 2004/0267871 A1 | 12/2004 | Pratley et al. | |
| 2005/0026131 A1 | 2/2005 | Elzinga et al. | |
| 2005/0198103 A1 | 9/2005 | Ching | |
| 2006/0015557 A1 | 1/2006 | Bodin et al. | |
| 2006/0026502 A1 | 2/2006 | Dutta | |
| 2006/0036934 A1 | 2/2006 | Fujiwara | |
| 2006/0053380 A1 * | 3/2006 | Spataro | G06F 17/30011 715/753 |
| 2006/0069599 A1 | 3/2006 | Hatoun et al. | |
| 2006/0080432 A1 | 4/2006 | Spataro et al. | |
| 2006/0101321 A1 * | 5/2006 | Friedrichowitz | G06F 17/243 715/255 |
| 2006/0136837 A1 | 6/2006 | Ben-Shachar et al. | |
| 2006/0195431 A1 | 8/2006 | Holzgrafe et al. | |
| 2006/0248144 A1 | 11/2006 | Zhu et al. | |
| 2007/0016650 A1 | 1/2007 | Gilbert et al. | |
| 2007/0118598 A1 | 5/2007 | Bedi et al. | |
| 2007/0186171 A1 * | 8/2007 | Junuzovic | G06Q 10/10 715/751 |
| 2007/0203903 A1 | 8/2007 | Attaran Rezaei et al. | |
| 2007/0226604 A1 | 9/2007 | Chalasani et al. | |
| 2007/0233811 A1 * | 10/2007 | Rochelle | G06F 17/246 709/219 |
| 2007/0294631 A1 | 12/2007 | Wiseman | |
| 2008/0028300 A1 * | 1/2008 | Krieger | G06Q 10/10 715/255 |
| 2008/0059539 A1 * | 3/2008 | Chin | G06Q 10/10 |
| 2008/0086718 A1 | 4/2008 | Bostick et al. | |

OTHER PUBLICATIONS

E. James Whitehead, Jr. et al.; "WebDAV: a Network Protocol for Remote collaboratie Authoring on the Web"; dated Apr. 21, 1999 (http://www.ics.uci.edu/~ejw/papers/dav-escw.pdf).

C. Plessl "Collaborative Authoring of Scientific Papers"; dated Jan. 1, 2007; (http://plesslweb.ch/2007/01/01/collaborative-authoring-of-scientific-papers-introduction/).

International Search Report dated Oct. 31, 2008, in PCT/US2008/065476.

"Office Action Received for Taiwan Patent Application No. 97121943", dated Oct. 22, 2013, Filed Date: Jun. 12, 2008, 5 Pages.

"Notice of Allowance Received for Taiwan Patent Application No. 97121943", dated Jan. 21, 2014, Filed Date: Jun. 12, 2008, 4 Pages.

* cited by examiner

US 10,015,215 B2

INTEGRATED COLLABORATIVE USER INTERFACE FOR A DOCUMENT EDITOR PROGRAM

RELATED APPLICATIONS

This application is a continuation of application Ser. No. 13/098,156, filed Apr. 9, 2011, now U.S. Pat. No. 8,943,417, which is a continuation of application Ser. No. 11/824,560, filed Jun. 29, 2007, now U.S. Pat. No. 7,937,663, which are hereby incorporated by reference in their entirety.

BACKGROUND

Document authoring projects may require multiple authors each working from separate computing stations. One author may prepare a first portion of the document and another author may prepare another portion of the document. The portions are then spliced together by an editor to form a single document. This type of collaborative authoring may include each of the authors checking-out a document to add content and checking-in a document when changes are complete. The checking-out and checking-in process may cause conflicts, restrict document availability for the authors, and cause document status confusion.

In other situations, drafts of documents are circulated by email and cause excessive versioning. Commenting format does not exist in emails, so an author may include comments in the email, add comments to an attached document, comment through highlighting, or simply make changes without identifying what has been changed. Such emailing of drafts causes excessive circulation, tracking issues, lost drafts, mismanagement, and loss of productivity.

SUMMARY

This Summary is provided to introduce a selection of concepts in a simplified form that are further described below in the Detailed Description. This Summary is not intended to identify key and/or essential features of the claimed subject matter. Also, this Summary is not intended to limit the scope of the claimed subject matter.

Aspects of the disclosure pertain to an integrated collaborative user interface for a document editor program. The integrated collaborative user interface includes a document pane, document details pane and a section details pane. Document details and section details are obtained and provided to authors. An author views the document details, views the section details and provides updates to a document in the document editor program. Changes are then refreshed to provide a consistent and up-to-date status of the document.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

Embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope. Embodiments may be practiced as methods, systems or devices. Accordingly, embodiments may take the form of an entirely hardware implementation, an entirely software implementation or an implementation combining software and hardware aspects. The following detailed description is, therefore, not to be taken in a limiting sense.

The logical operations of the various embodiments are implemented (1) as a sequence of computer implemented steps running on a computing system and/or (2) as interconnected machine modules within the computing system. The implementation is a matter of choice dependent on the performance requirements of the computing system implementing the invention. Accordingly, the logical operations making up the embodiments described herein are referred to alternatively as operations, steps or modules.

Aspects of the disclosure pertain to an integrated collaborative user interface for a document editor program. A document editor program is provided that includes a collaborative user interface integrated with the document editor program. The collaborative user interface may be accessed from a ribbon tab. The collaborative user interface includes a document pane where an author or editor may generate a document. The collaborative user interface may also include a document assembly pane. The document assembly pane includes document details and section details. The document details pane may include the owner of the document, the filename of the document, and an abstract of the document. The section details include various sections of the document along with the author assigned to the section. The section details may be expanded to ascertain the status of each of the sections. Upon refreshing the document, the sections are updated with the most current content and status from the authors. As such, author and editors are provided a seamless user experience during collaboration with the document editor program. Multiple authors may edit the contents of different sections of the same document at the same time. Efficiency is increased because the status and content are updated upon refresh. Authors and editors may easily view the entirety of the document even when the document is in a draft state.

Figure 1:
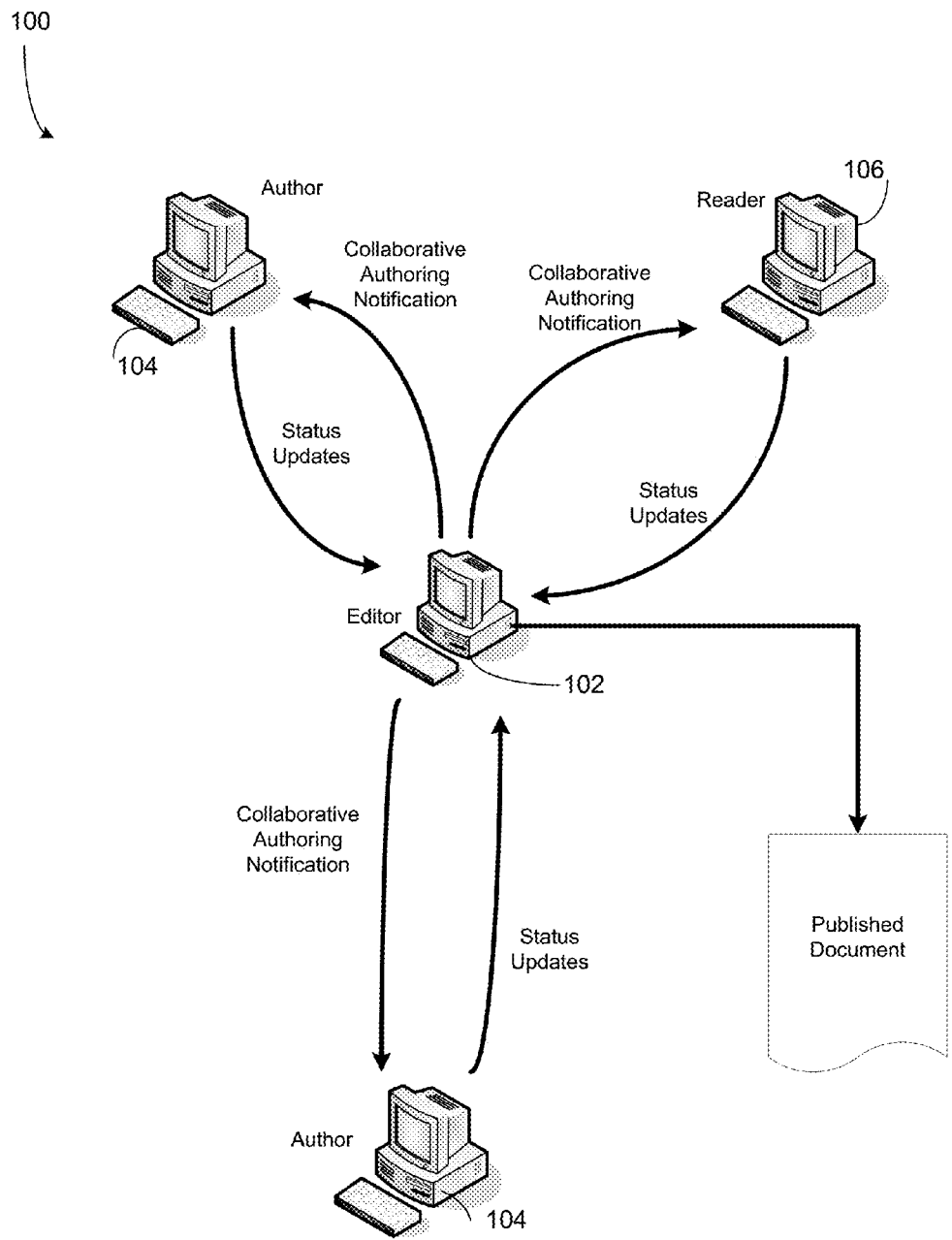
FIG. 1 represents one exemplary and generalized system overview for collaborative authoring.
Figure 17:
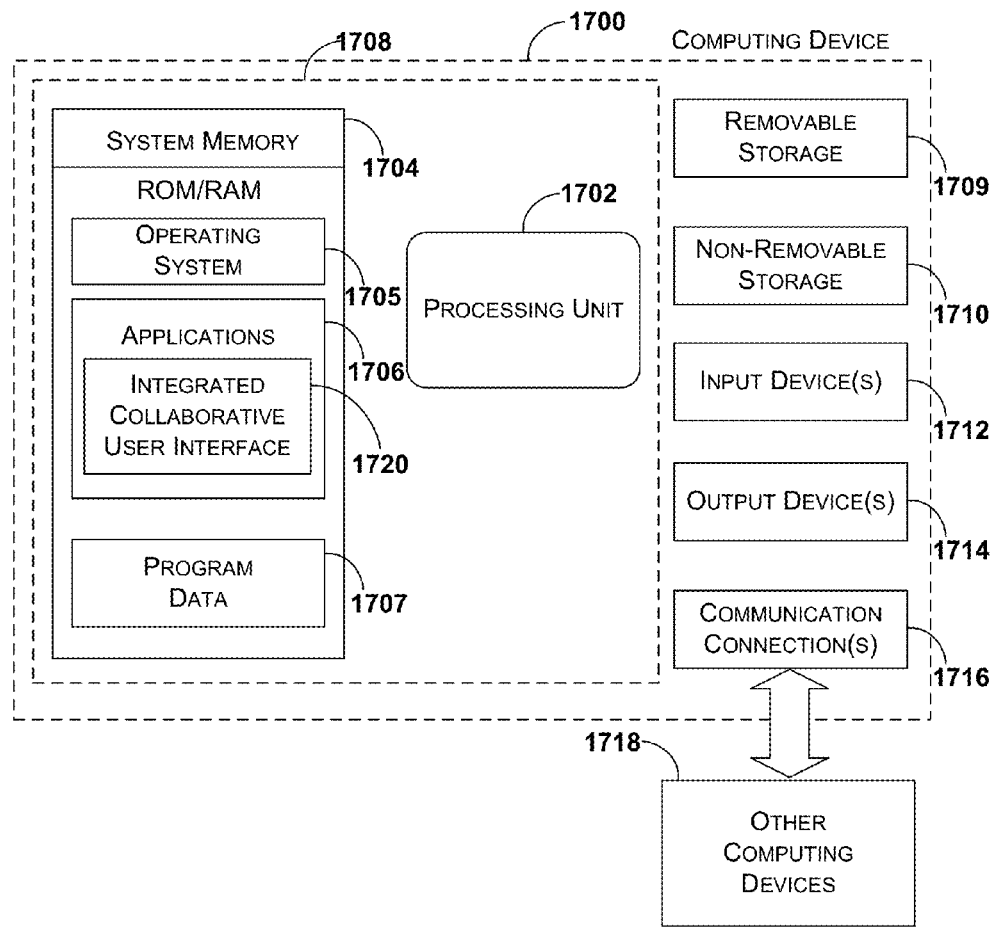
FIG. 17 represents an exemplary computing device.

FIG. 1 represents one exemplary and generalized system overview for collaborative authoring. System 100 includes editor 102, and author(s) 104 and reader 106. Editor 102 and author(s) 104 may include a computing environment as depicted in FIG. 17 below. Editor 102 generates a collaborative authoring notification indicating that a document has been generated for collaborative authoring. Author(s) 104 collaborate on the document in accordance with the document and section details generated by editor 102. Author(s) 104 submit additions to the document and update the status for the document sections. Reader 106 is a participant who is allowed read-only access to the collaboration process. Upon refreshing, reader 106, editor 102 and author(s) 104 may view an updated document. In other aspects, reader 106, editor 102 and author(s) 104 may view an updated document according to viewing privileges. Features of the integrated collaborative user interface are more fully set forth below.

Figure 2:
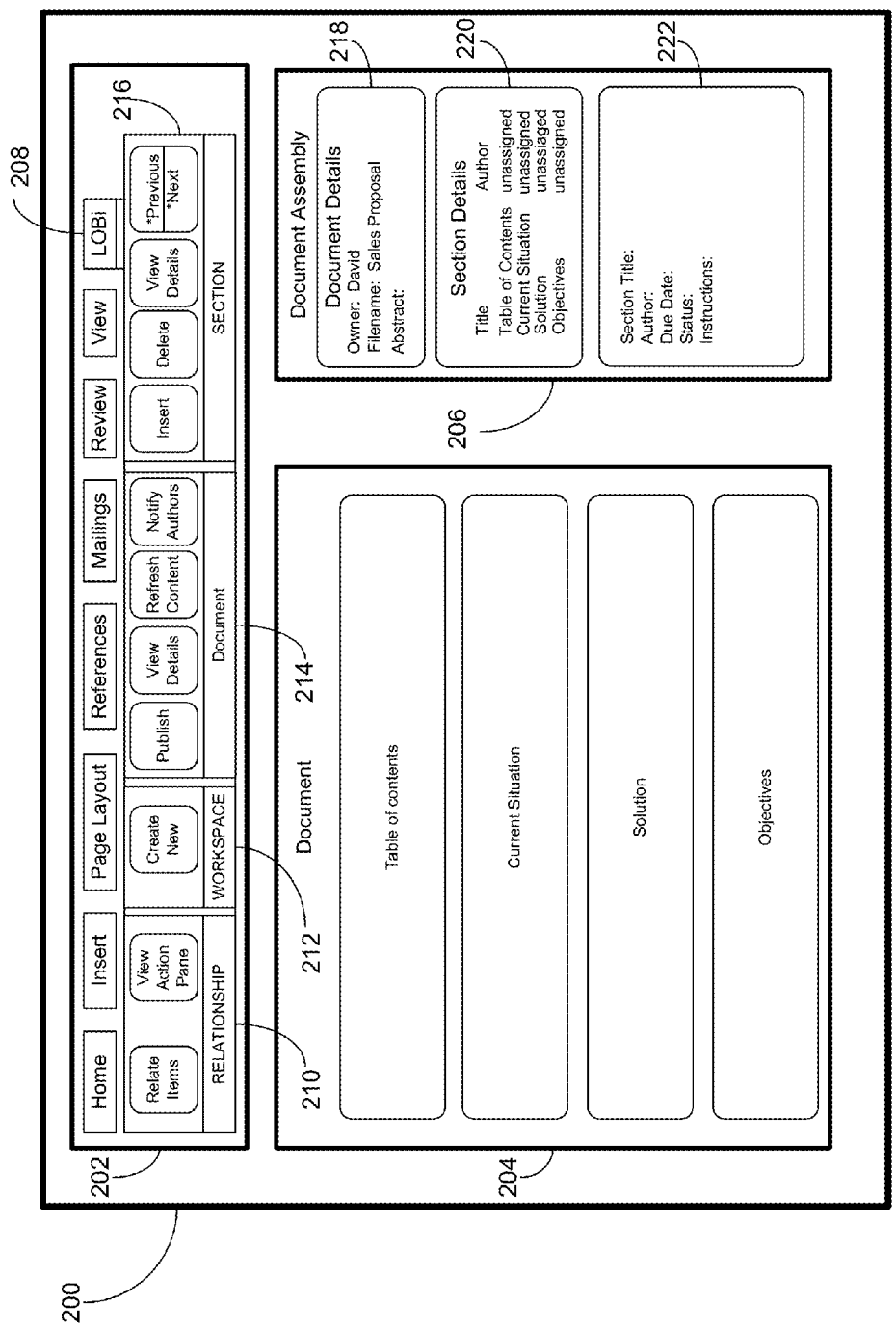
FIG. 2 represents general editor features of an integrated collaborative user interface for a document editor program.

FIG. 2 represents general editor features of an integrated collaborative user interface for a document editor program. Document editor 200 includes ribbon menu pane 202, document editing pane 204, and document assembly pane 206. Ribbon menu pane 202 includes line of business integration ribbon 208. Line of business integration ribbon 208 includes collaborative authoring functionality so that an author/editor does not need to navigate from document editor 200 to perform collaborative authoring. The functionality of a collaborative authoring environment is accessible and integrated in the document editor program so that a user may perform collaborative functions while preparing a document.

Line of business ribbon 208 includes relationship ribbon 210, workspace ribbon 212, document ribbon 214 and section ribbon 216. Relationship ribbon 210 includes a related items button and a view action pane button. Workspace pane 212 includes a create new button. Document pane 214 includes a publish button, a view details button, a refresh button, and a notify authors button. Section pane 216 includes an insert button, a delete button, a view details button, a previous button, and a next button. The buttons associated with line of business ribbon 208, depicted in FIG. 2, are examples. Functionality associated with Line of business ribbon 208 may include any type of button or feature for collaborative authoring and are not limited to those depicted in FIG. 2.

Upon receiving a selection of line of business ribbon 208, document assembly pane 206 may be displayed in document editor 200. Document assembly pane 206 includes document details pane 218. Document details pane 218 may include metadata associated with a document generated for collaborative authoring. Document details pane 218 may display the owner of the document. For example, the owner may be an editor of the document or a team leader for a group. Document details pane 218 may include a filename for the document and an abstract. The abstract may display a text blurb describing the content of the document. From document details pane 218, an owner or assigned author may quickly tell who created the collaborative document, the file name of the document and the general subject matter of the document.

Document assembly pane 206 may also include section details pane 220. Section details pane displays metadata associated with each section of the document. Section details pane 220 includes a title and an author section. Section details pane 220 displays the titles associated with the document along with the author assigned to each title. In this manner an editor or author may easily determine an assignment of authoring tasks. For example, section details pane 220 depicts four sections which correspond to sections of document 204. Each section may be assigned an author responsible for the section. Even though document 204 is depicted as several block sections, document 204 may be formatted as a word processing document utilizing a markup language ("ML"). The ML correlates the document sections with metadata associated with document assembly pane 206.

Document assembly pane 206 may also include expanded section details pane 222. The expanded sections details pane 222 may populate and/or display metadata associated with a selected section. Expanded sections details pane 222 includes a section title, an author, a due date for the authoring of the section, the status of the section, and instructions for authoring the section. As an example, the table of contents may be selected in section details pane 220. Upon selecting, expanded sections details pane 222 displays the section title as "Table of Contents." The author is displayed as the author selected for the section by the owner of the document. The due date for the section is displayed. The status of the section is displayed (e.g. unassigned, assigned, draft, completed, etc). Instructions for drafting may also be displayed. In this manner, an editor or author may easily generate a collaborative authoring document, assign a collaborative authoring document, update a collaborative authoring document, check status of a collaborative authoring document, refresh a collaborative authoring document and publish a collaborative authoring document.

Figure 3:
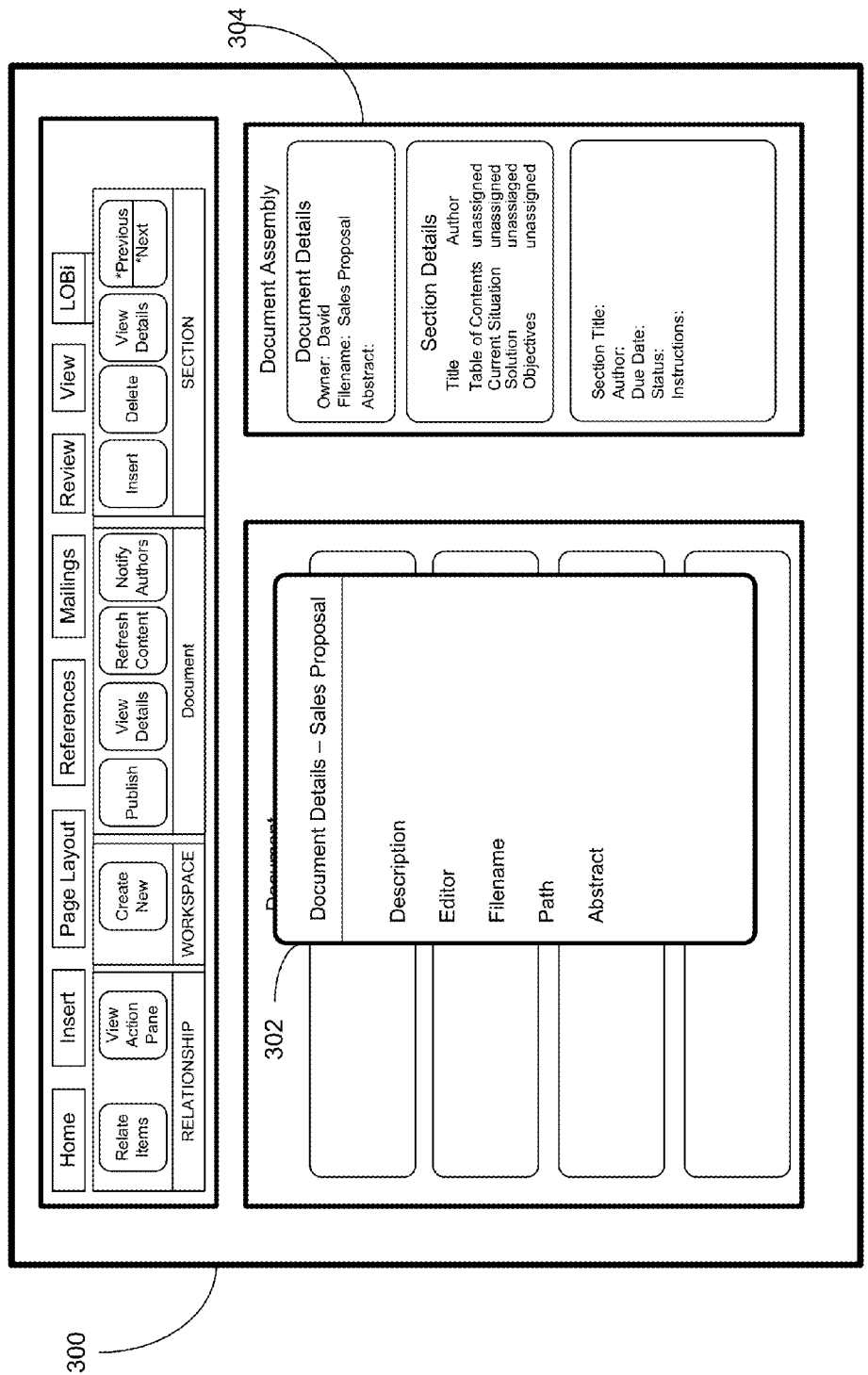
FIG. 3 represents document details of an integrated collaborative user interface for a document editor program.

FIG. 3 represents document details of an integrated collaborative user interface for a document editor program. Document editor 300 includes document details set-up interface 302. Document details set-up interface 302 provides an editing interface for editing document level properties. Document details set-up interface 302 includes a description field for receiving a description of the document. Document details set-up interface 302 also includes an editor field for identifying the editor of the document. Document details set-up interface 302 may include a filename field for identifying the filename associated with the document. Document details set-up interface 302 also includes a path field for receiving a path associated with a workspace in a multi-user environment. Document details set-up interface 302 may also include an abstract field for receiving an abstract of the document. After the fields are populated or changed, the received data may be displayed in association with document assembly pane 304.

Figure 4:
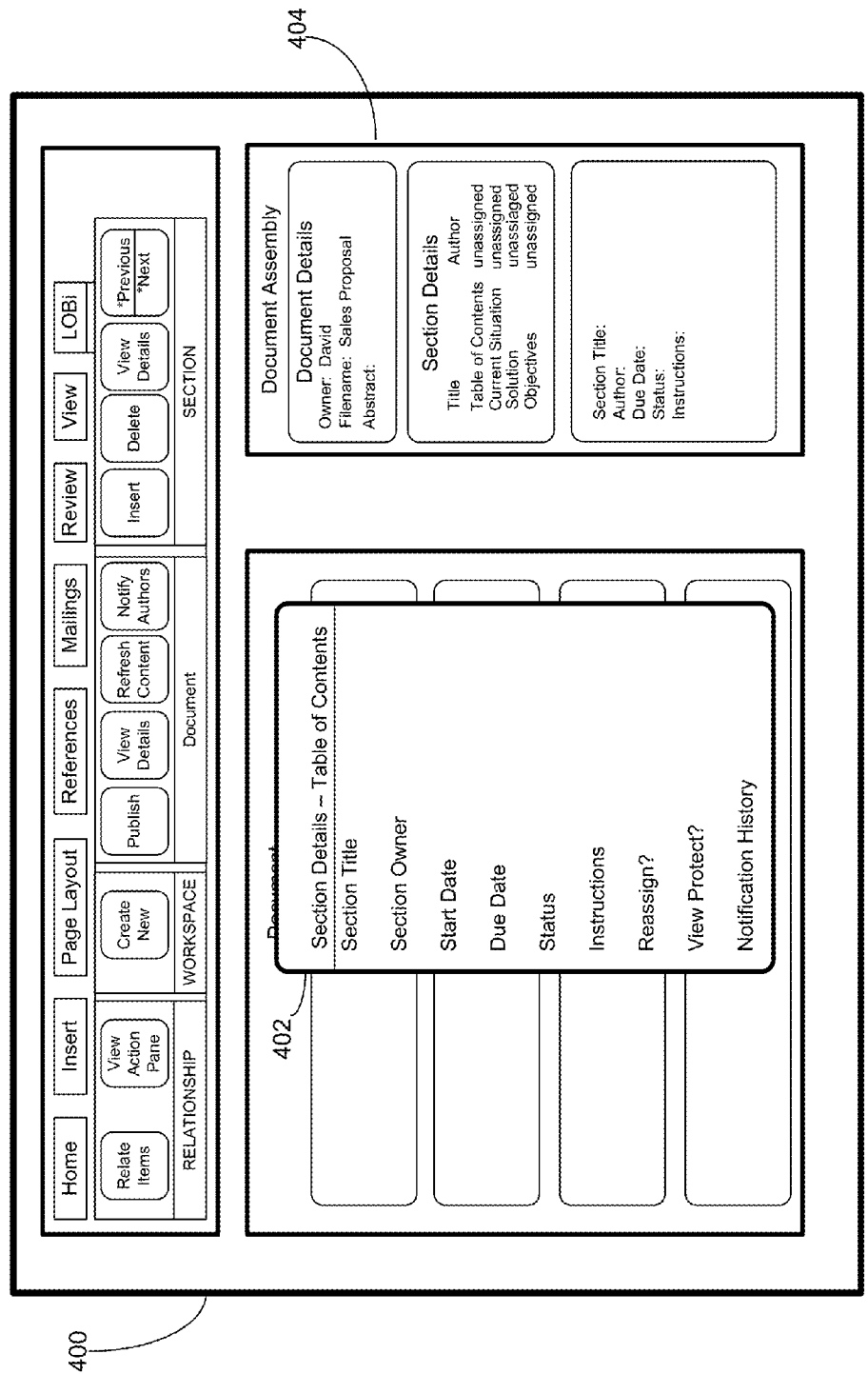
FIG. 4 represents section details of an integrated collaborative user interface for a document editor program.

FIG. 4 represents section details of an integrated collaborative user interface for a document editor. Document editor 400 includes section details set-up interface 402. Section details set-up interface 402 provides an editing interface for editing section level properties. Section details set-up interface 402 includes a section title field for receiving a title for a section of the document. Section details set-up interface 402 includes a section owner field for assigning an author for the section. Section details set-up interface 402 includes a start date field for receiving data associated with the start of an authoring project. Section details set-up interface 402 includes a due date field for setting a completion date for the section or project. Section details set-up interface 402 includes a status field for indicating a status of the section (e.g. assigned, unassigned, draft, completed, etc). Section details set-up interface 402 includes instructions field for receiving instructions to associate with the section during authoring. Section details set-up interface 402 includes reassignment field which either locks or opens reassignment functionality for an editor or author. For example, an editor may assign a section to a first author and then later reassign the section to a second author. As another example, an editor may assign a section to a team leader author and the team leader author may reassign the section to a team member. Section details set-up interface 402 may include a view protection field. The view protection field may be set to restrict access of the section. For example, the editor may assign section 1 to author 1. The editor may not want author 2 to view section 1. The editor may set a section view restriction on section 1 so that author 2 cannot see section 1 of the document. As another example, the view protection field may lock the document for editing except for sections the user has rights to edit. As such, authors would not be able to edit sections not assigned to them and readers would not be able to edit the document sections. In other cases, a section may be flagged as hidden so that users granted read access can see the content while users not granted access cannot. Section details set-up interface 402 may also include a notification history field that indicates when the assigned author was assigned the section. After the fields are populated or changed, the received data may be displayed in association with document assembly pane 404.

Figure 5:
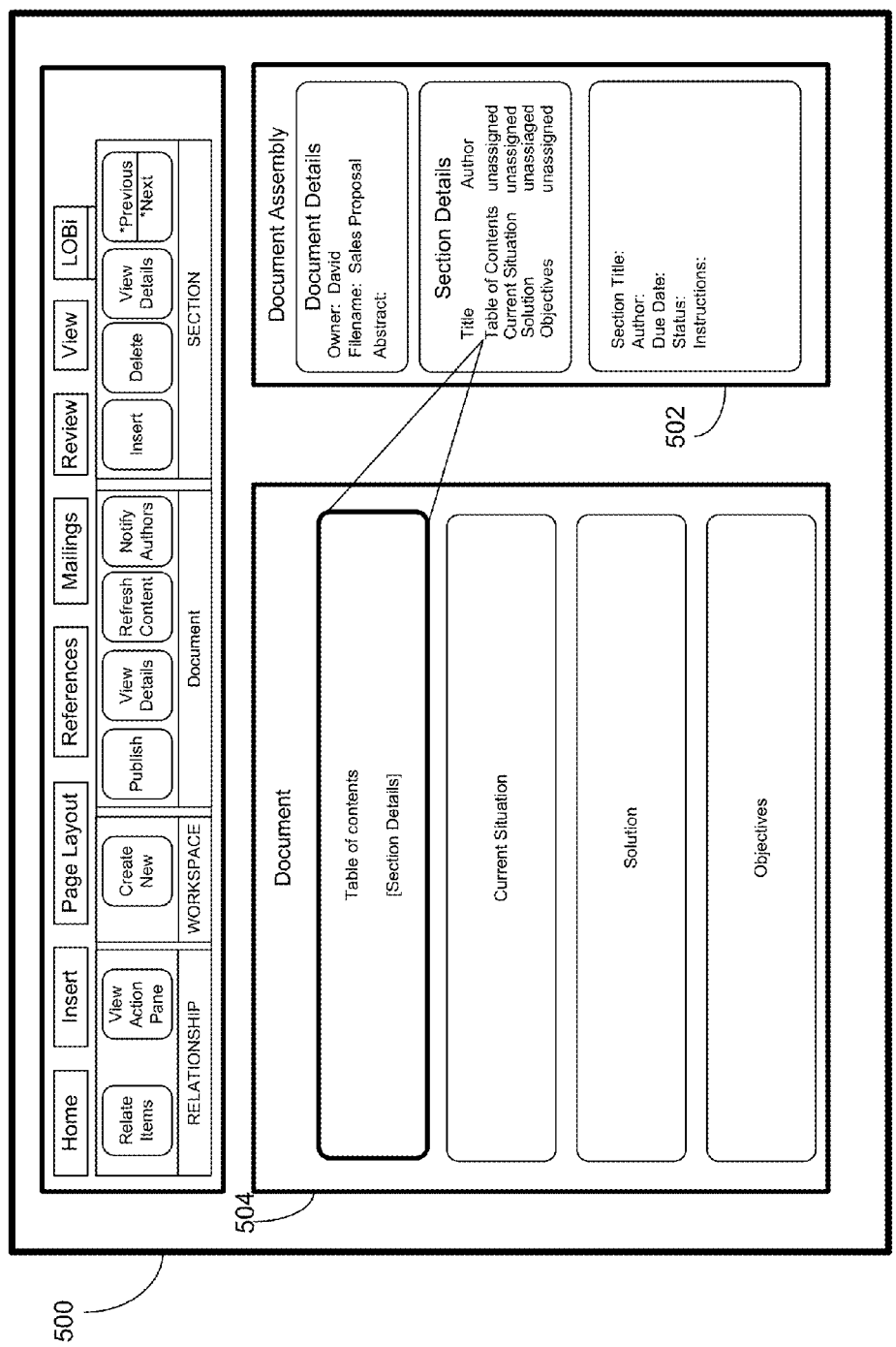
FIG. 5 represents selected section details of an integrated collaborative user interface for a document editor program.

FIG. 5 represents selected section details of an integrated collaborative user interface for a document editor program. Document editor 500 includes section detail pane 502. When a title of the document is selected, document editor 500 navigates to the respective portion of document 504. For example, a user may be on page 50 of document 504. The user may desire viewing the progression of an assigned author in association with the table of contents. By selecting the table of contents in section details pane 502, the editor table of contents portion of the document is automatically displayed.

Figure 6:
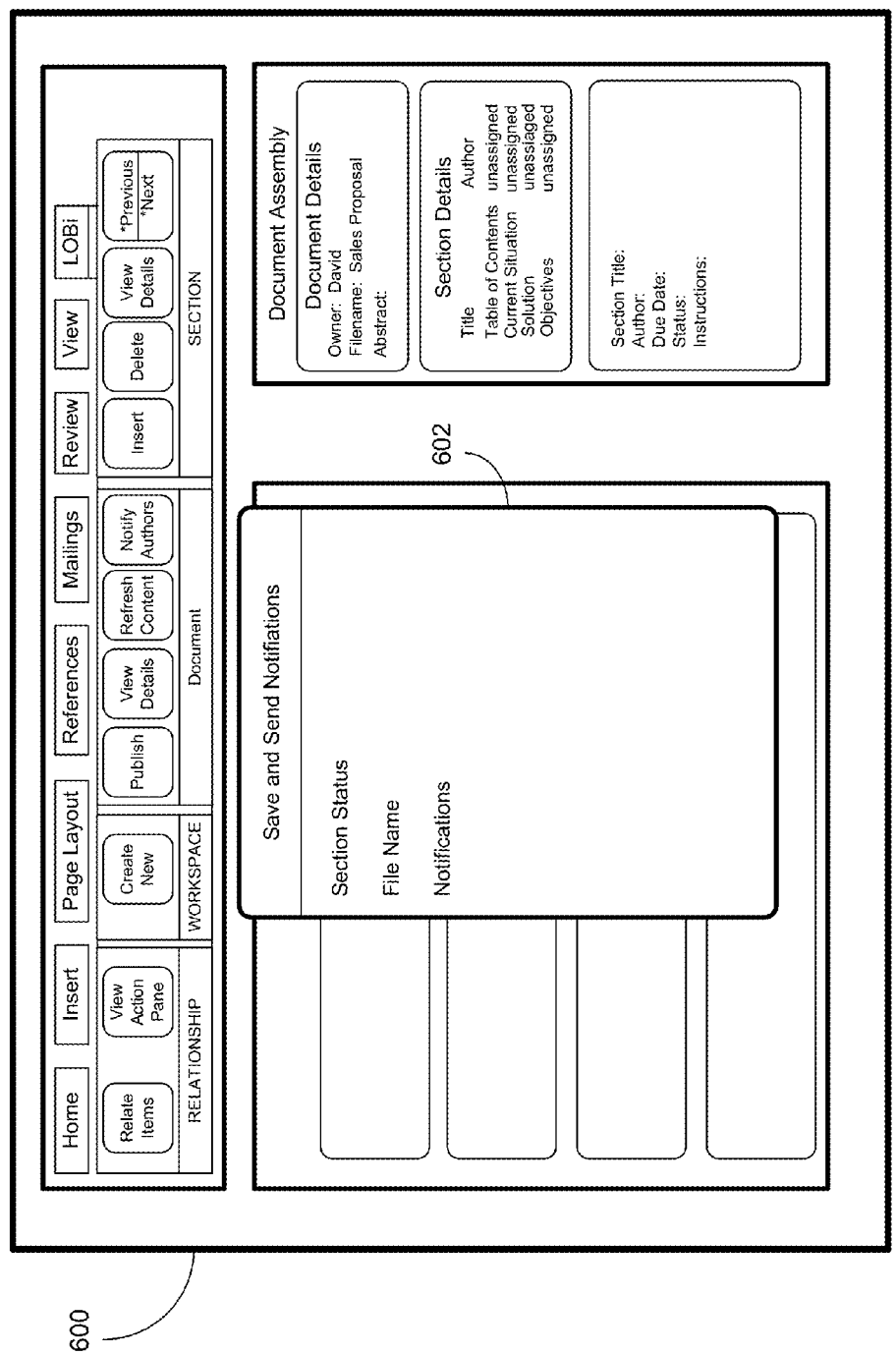
FIG. 6 represents notification features of an integrated collaborative user interface for a document editor program.

FIG. 6 represents notification features of an integrated collaborative user interface for a document editor program. Document editor 600 includes notification interface 602. Notification interface 602 includes section status field which includes a summary of the status of the sections of the document. Notification interface 602 also includes file name field for identifying the file name of the document. Notification interface 602 also includes notification field for sending notifications to authors assigned to sections.

Figure 7:
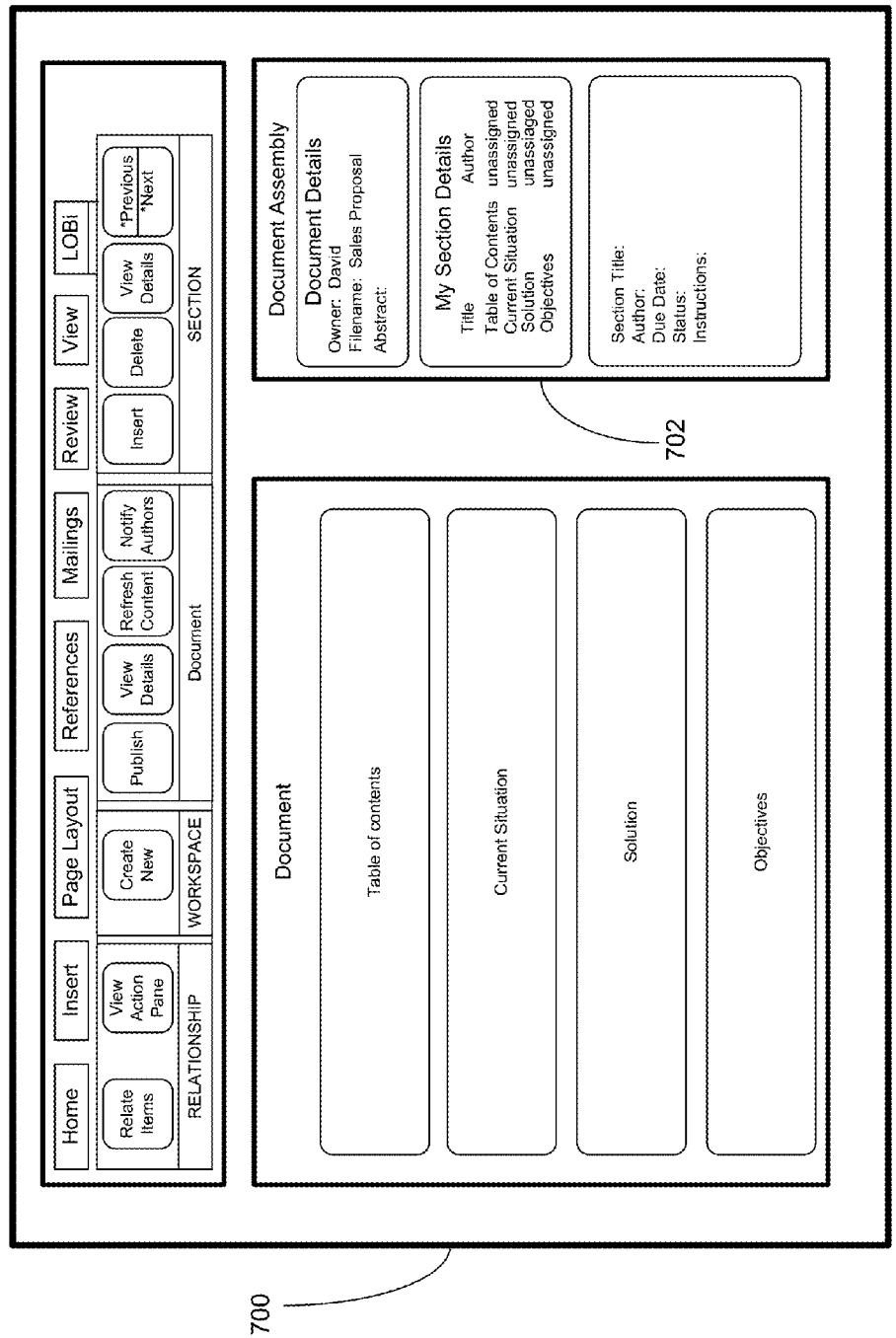
FIG. 7 represents general author features of an integrated collaborative user interface for a document editor program.

FIG. 7 represents general author features of an integrated collaborative user interface for a document editor program. Document editor 700 includes a document editor of an author after the author has been notified that the editor has implemented collaborative authoring. Document editor 700 includes similar functionality and panes as FIG. 2. Document editor 700 includes document assembly pane 702. Document assembly pane 702 includes the metadata set by the owner of the document. From document assembly pane 702 a collaborative author may easily determine what sections have been assigned to the author, the due date of the sections, the status of the sections, an abstract of the document, and any instructions for completing the section. In one aspect, document assembly pane 702 displays the authors assigned to sections of the document. In another aspect, document assembly pane 702 displays all of the assignments and the authors for the assignments. In still another aspect, the author has limited access to the document.

Figure 8:
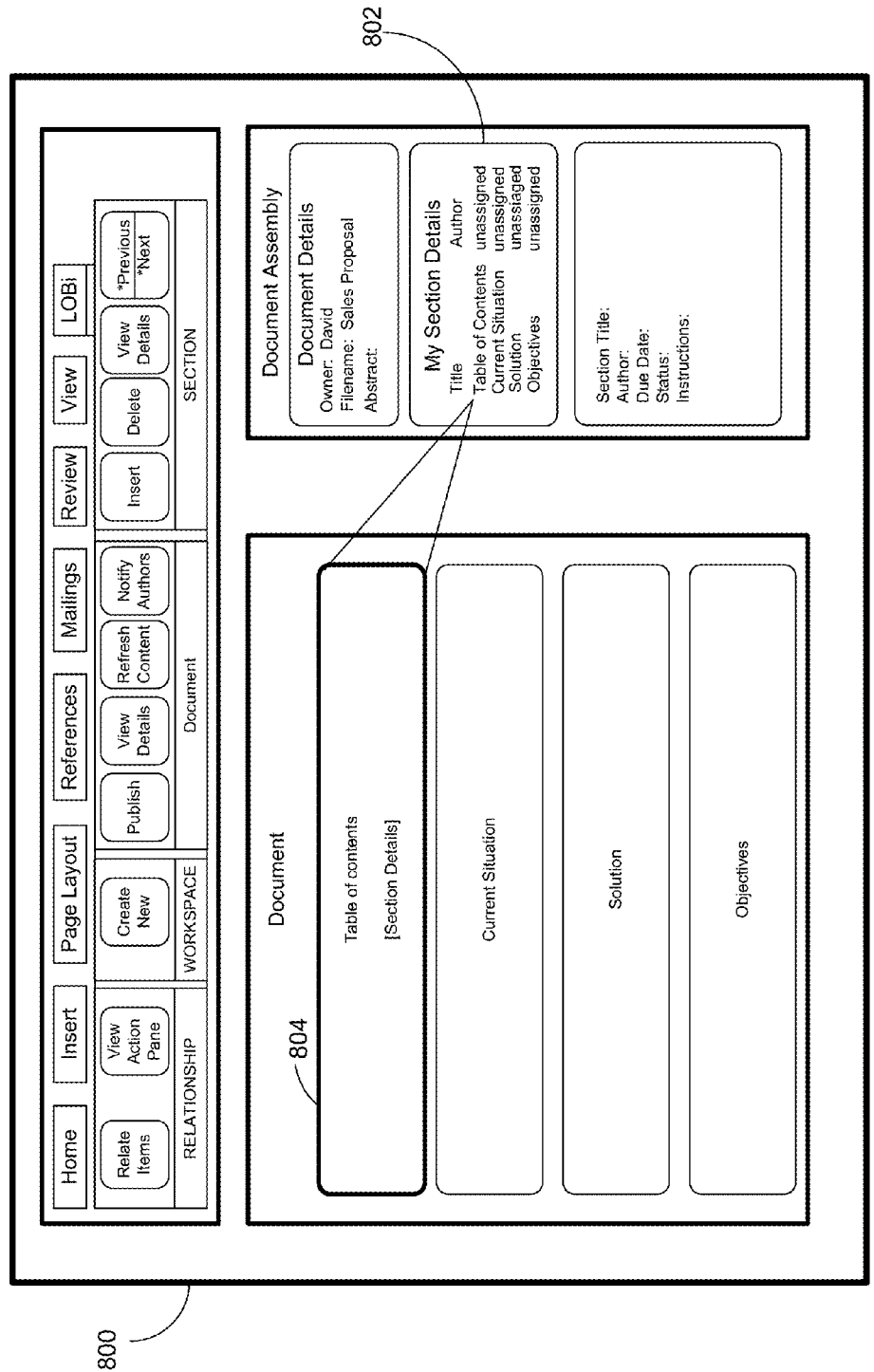
FIG. 8 represents author selected section details of an integrated collaborative user interface for a document editor program.

FIG. 8 represents author selected section details of an integrated collaborative user interface for a document editor program. Document editor 800 includes section detail pane 802. When an author selects a title of the document, document editor 800 navigates to the respective portion of document 804. In one aspect, the section details metadata that the editor associated with the section are displayed to the author. In this manner, the author may easily determine the purpose of the section.

Figure 9:
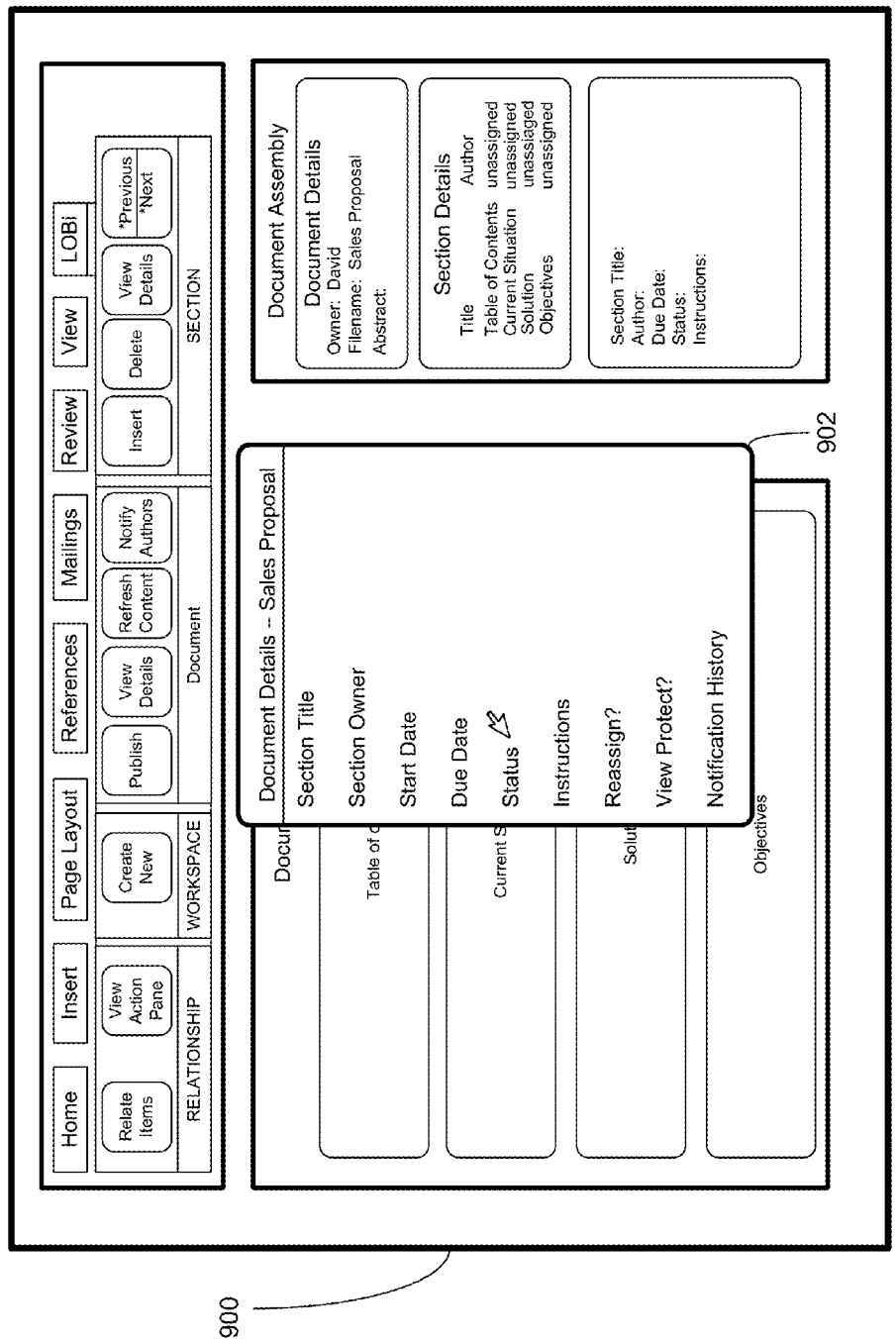
FIG. 9 represents author document details of an integrated collaborative user interface for a document editor program.

FIG. 9 represents author document details of an integrated collaborative user interface for a document editor program. Document editor 900 includes document details set-up interface 902. When the author is finished drafting the section, the author may access document details set-up interface 902 and change the status of the document. For example, the author may change the status of the document from "assigned" to "draft."

Figure 10:
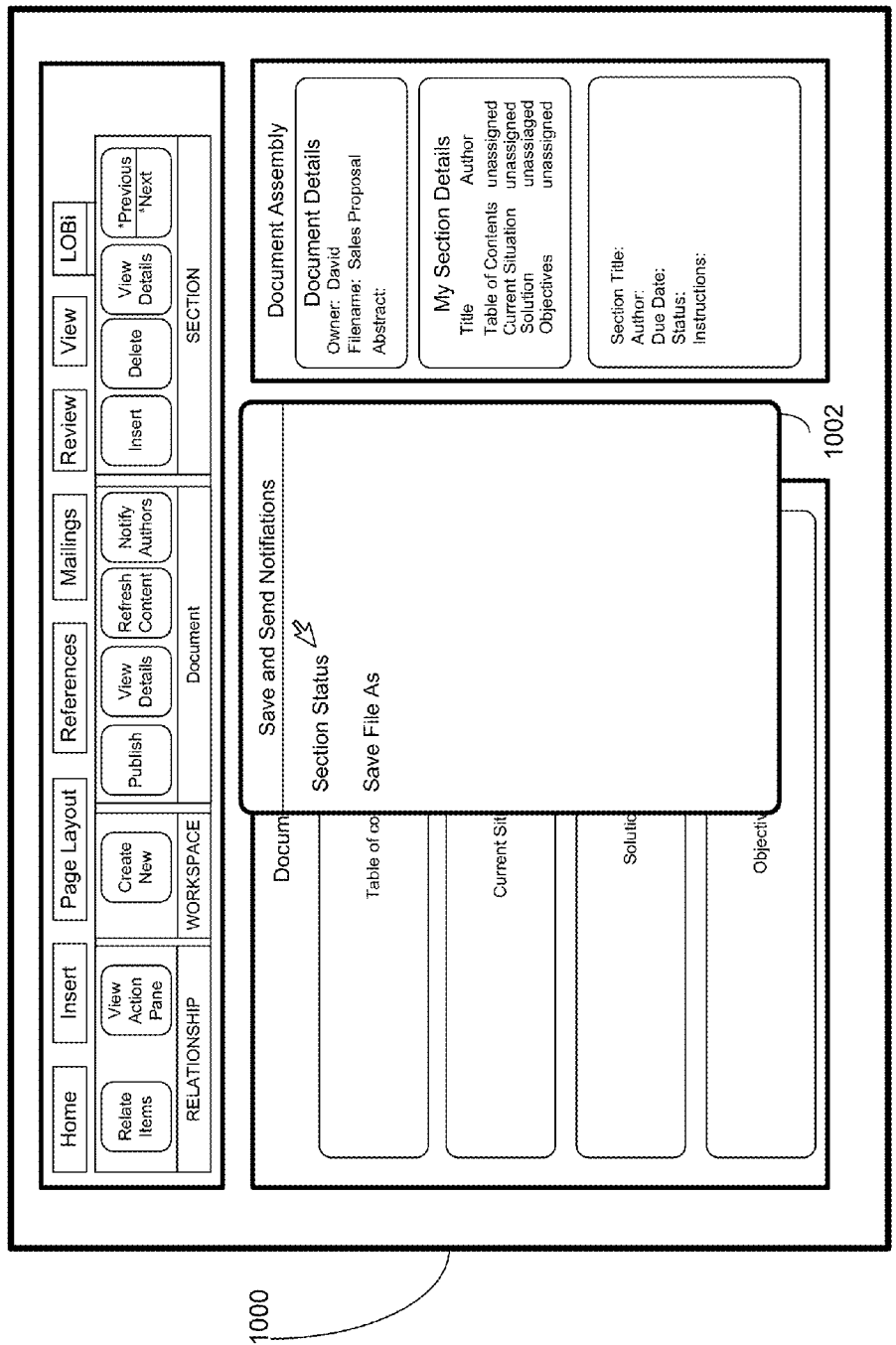
FIG. 10 represents a section status update feature of an integrated collaborative user interface for a document editor program.

FIG. 10 represents a section status update feature of an integrated collaborative user interface for a document editor program. Document editor 1000 includes notification pane 1002. Notification pane 1002 includes a section status field for indicating the status of the section. Notification pane 1002 also includes a save field for saving a new status of the section. Once the section is saved, a notification may be sent to the editor/authors that the status of the section has been changed.

Figure 11:
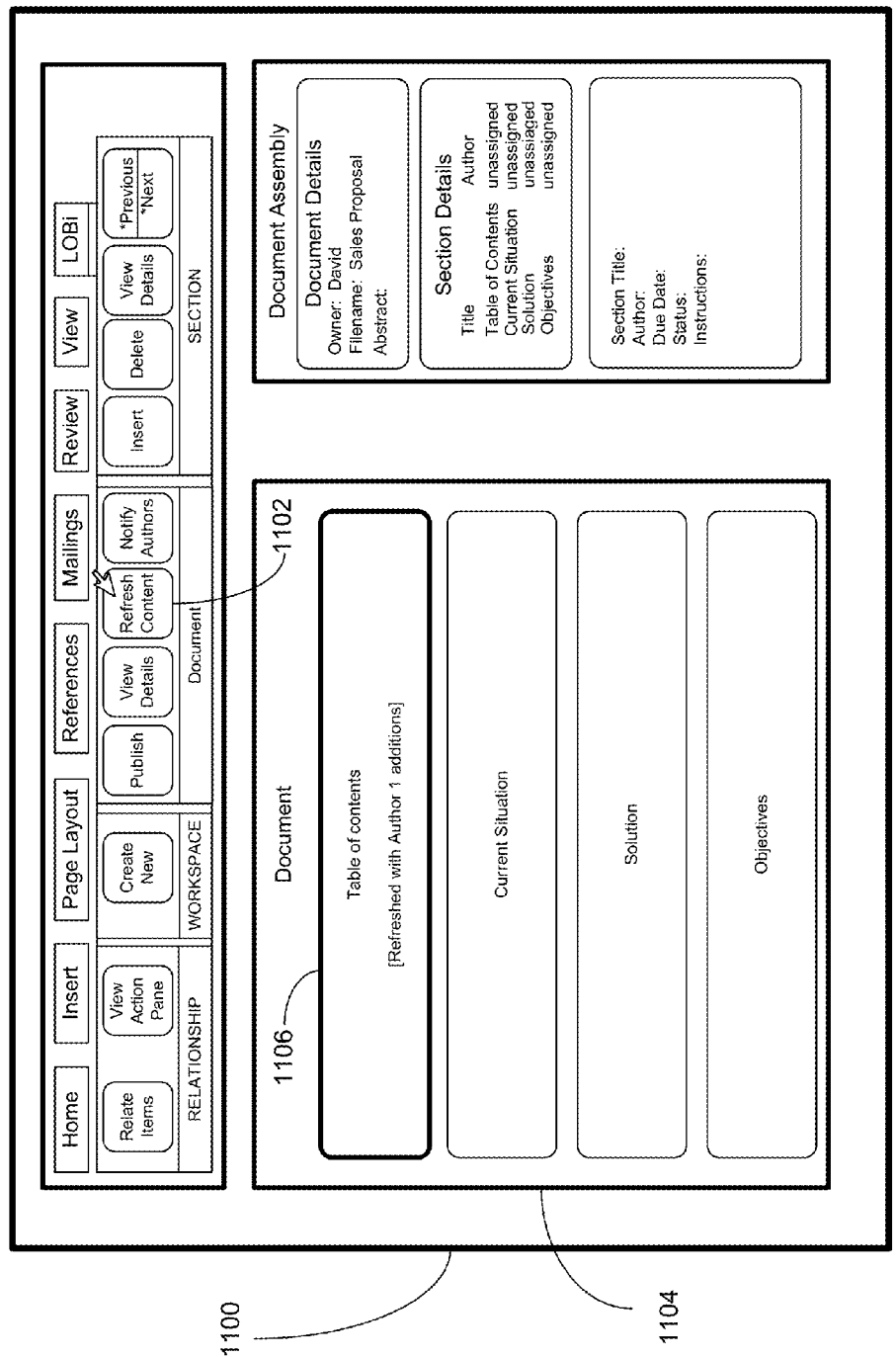
FIG. 11 represents a refresh feature of an integrated collaborative user interface for a document editor program.

FIG. 11 represents a refresh feature of an integrated collaborative user interface for a document editor program. Document editor 1100 may include features of the collaborative user interface when an editor/author refreshes the document. Refresh button 1102 is selected. Document 1104 automatically populates with updated content associated with sections that have been changed during an authoring period. In this manner, an editor may easily refresh a document to determine the current state of the document. As depicted in FIG. 11, table of contents section 1106 is updated to include the content the author generated. The refresh feature may be implemented from either the authors interface or the editors interface.

Figure 12:
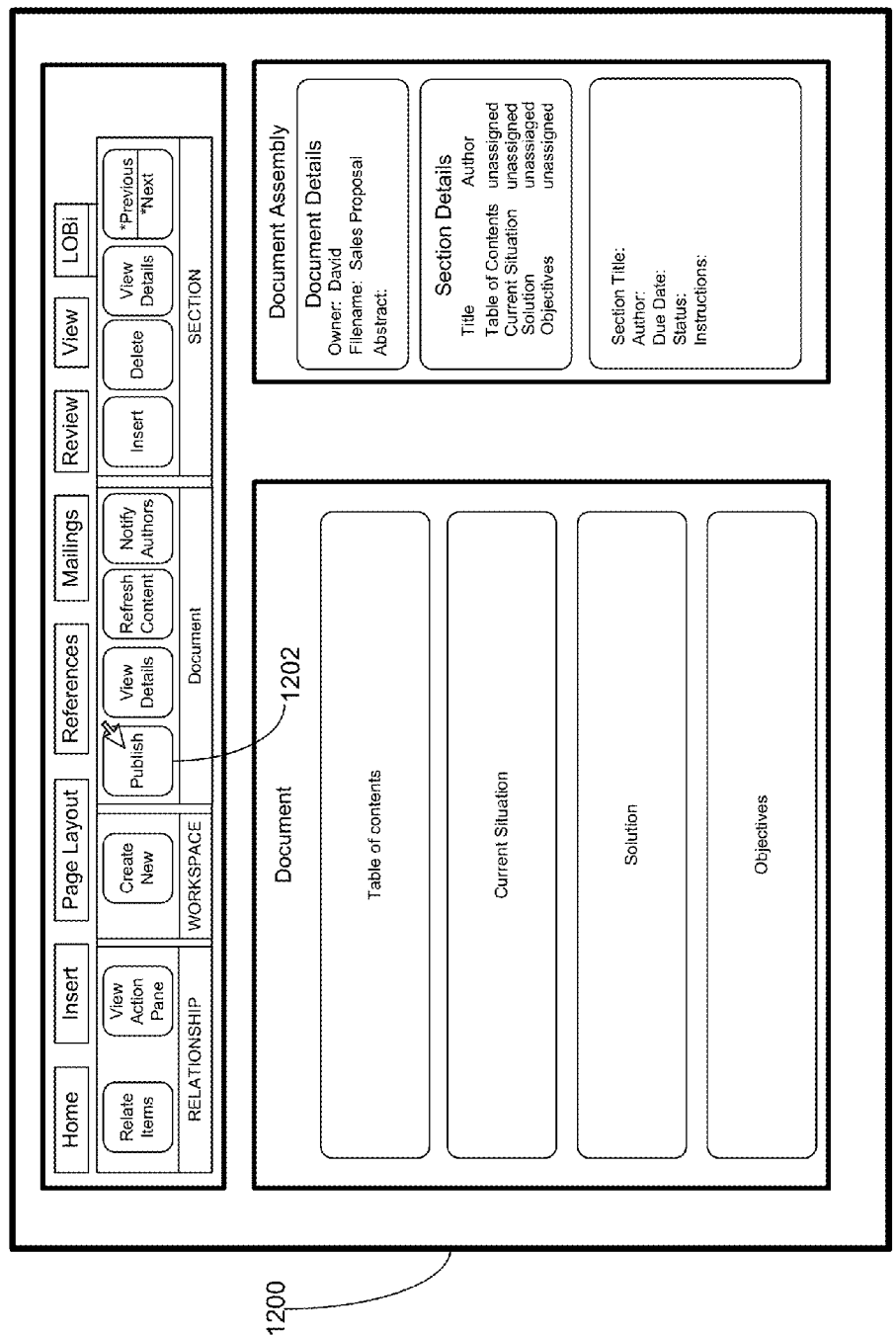
FIG. 12 represents a publish feature of an integrated collaborative user interface for a document editor program.

FIG. 12 represents a publish feature of an integrated collaborative user interface for a document editor program. Document editor 1200 may includes features of the collaborative user interface when an editor publishes the document. Publish button 1202 is selected.

Figure 13:
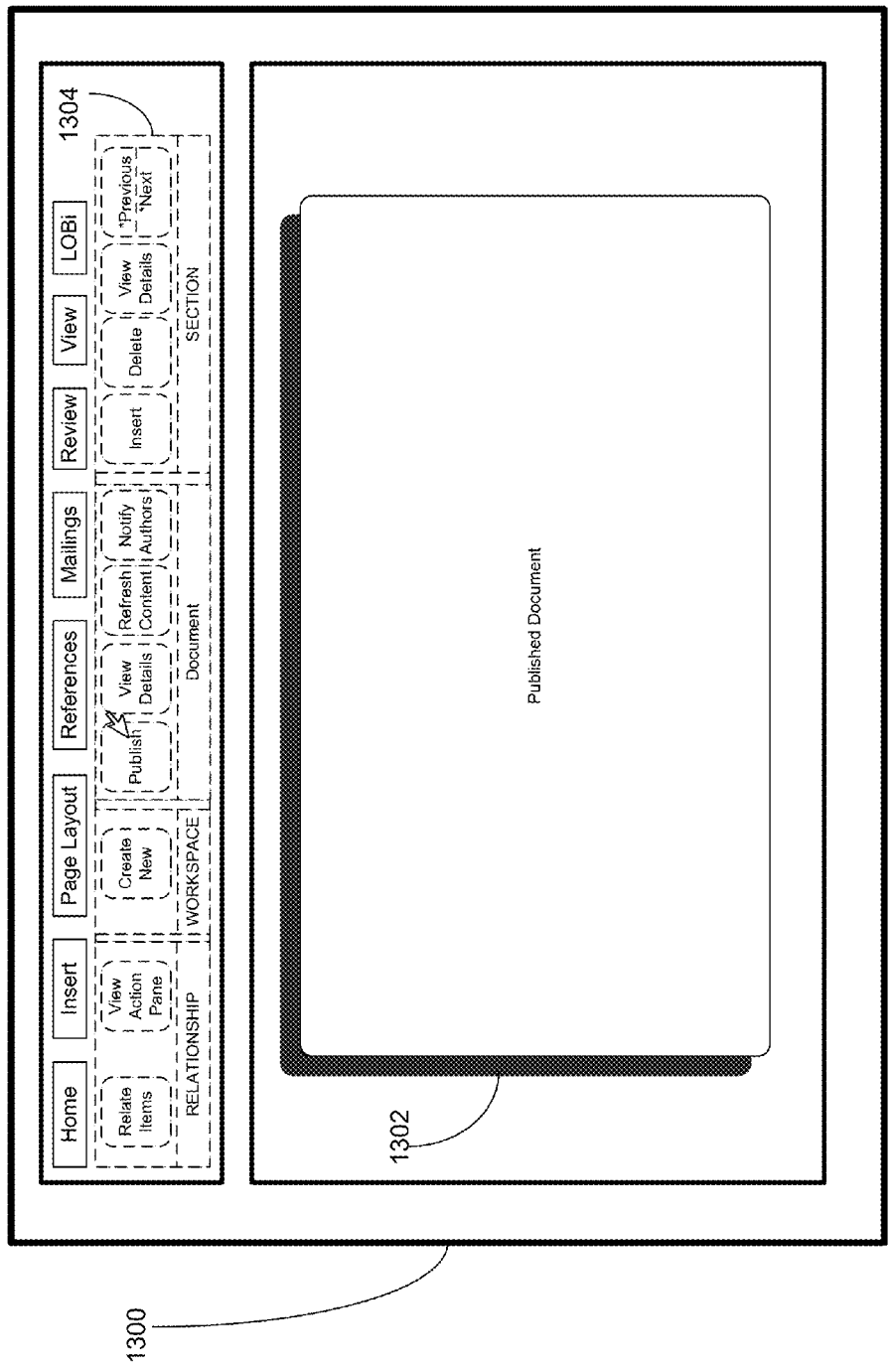
FIG. 13 represents a published document of an integrated collaborative user interface for a document editor program.

FIG. 13 represents a published document of an integrated collaborative user interface for a document editor program. Document editor 1300 includes published document 1302. When the document is published, the document assembly pane may be removed from document editor 1300 to provide an optimized view of the published document. Also, line of business ribbon 1304 may be disabled to indicate that the user interface is no longer in a collaborative mode.

Figure 14:
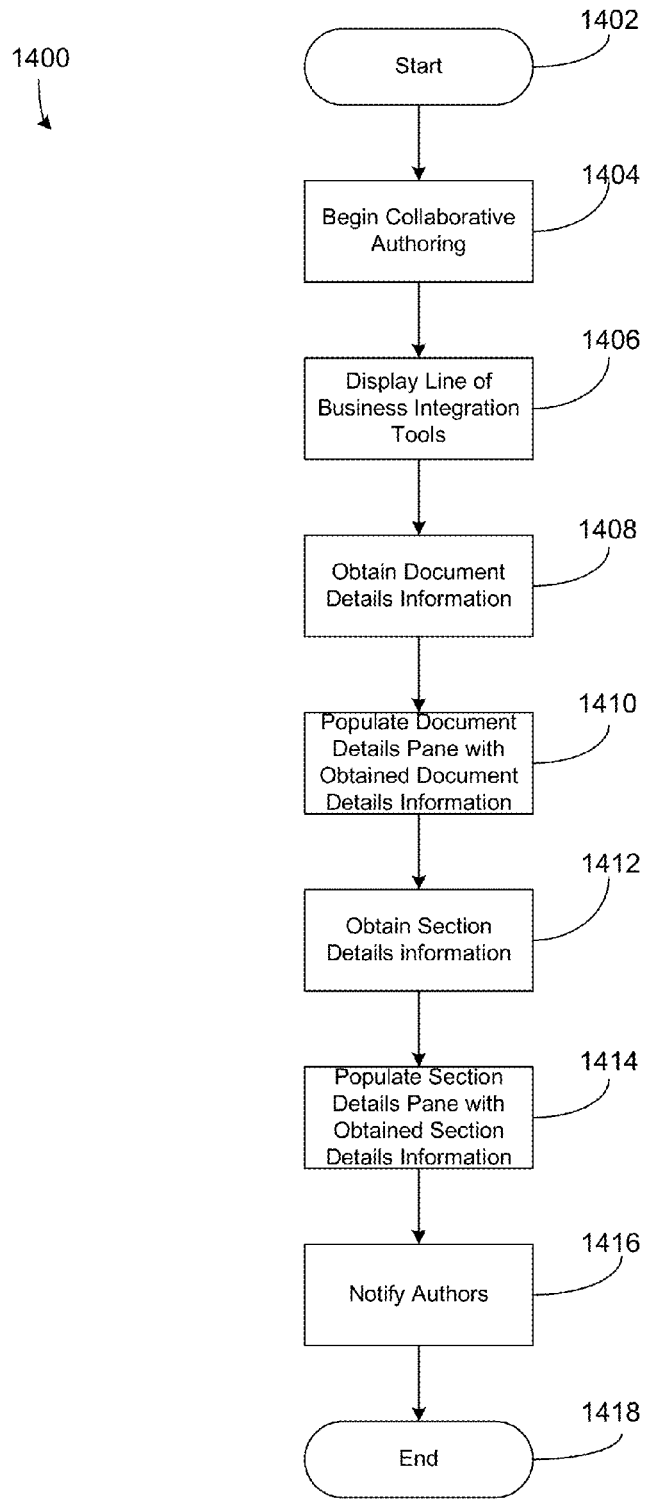
FIG. 14 represents an operational flow diagram for generating editor data for collaborative authoring.

FIG. 14 represents an operational flow diagram for generating editor data for collaborative authoring. Operational flow 1400 may represent operations associated with an editor setting up collaborative authoring on an integrated collaborative user interface. Operational flow 1400 begins at start operation 1402 and continues to operation 1404 where collaborative authoring is initiated. In one aspect, a line of business ribbon is actuated to initiate collaborative authoring. In another aspect, collaborative authoring is initiated from a menu.

Operational flow 1400 continues to operation 1406 where business integration tools are displayed. As depicted in FIG. 2, business integration tool may include a line of business integration ribbon and a document assembly pane. Operational flow 1400 continues to operation 1408 where document detail information is obtained. Document details may include details as depicted in FIG. 3. Operational flow 1400 continues to operation 1410 where the document details pane is populated with obtained document details information.

Operational flow 1400 continues to operation 1412 where section details information is obtained. Section details may include details as depicted in FIG. 4. Operational flow 1400 continues to operation 1414 where the section details pane is populated with obtained section details information. At operation 1416, the authors associated with the sections are notified that they have been selected for collaborative authoring of a document. Operational flow 1400 ends at end operation 1418.

Figure 15:
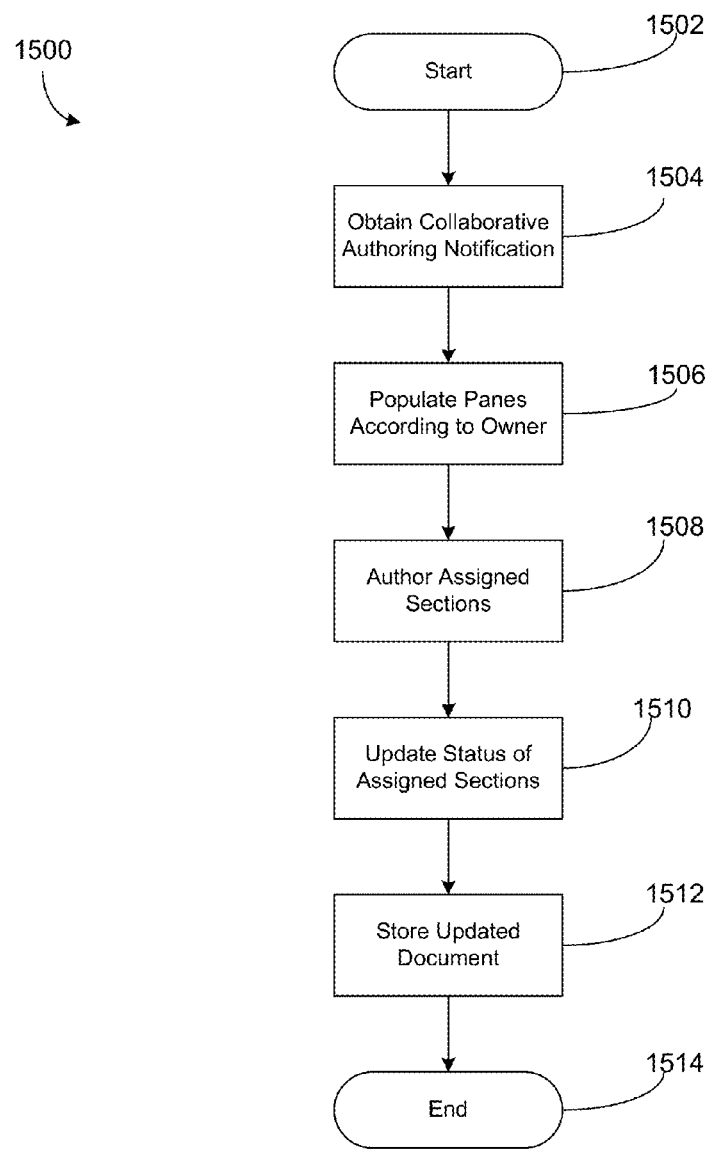
FIG. 15 represents an operational flow diagram for generating author data for collaborative authoring.

FIG. 15 represents an operational flow diagram for generating author data for collaborative authoring. Operational flow 1500 may represent operations associated with an author collaboratively authoring in association with an integrated collaborative user interface. Operational flow 1500 begins at start operation 1502 and continues to operation 1504 where a collaborative authoring notification is obtained. At operation 1506, the document assembly pane of the author is populated with the document and section metadata in accordance with the metadata input by the editor. Operational flow 1500 continues to operation 1508 where the author drafts the assigned section of the document. When the draft is finished, the status of the document is updated as shown by operation 1510. Operational flow 1500 continues to operation 1512 where the updated document and document status are stored. The editor and/or other authors may be sent a notification indicating the update. Operational flow 1500 continues to end operation 1514.

Figure 16:
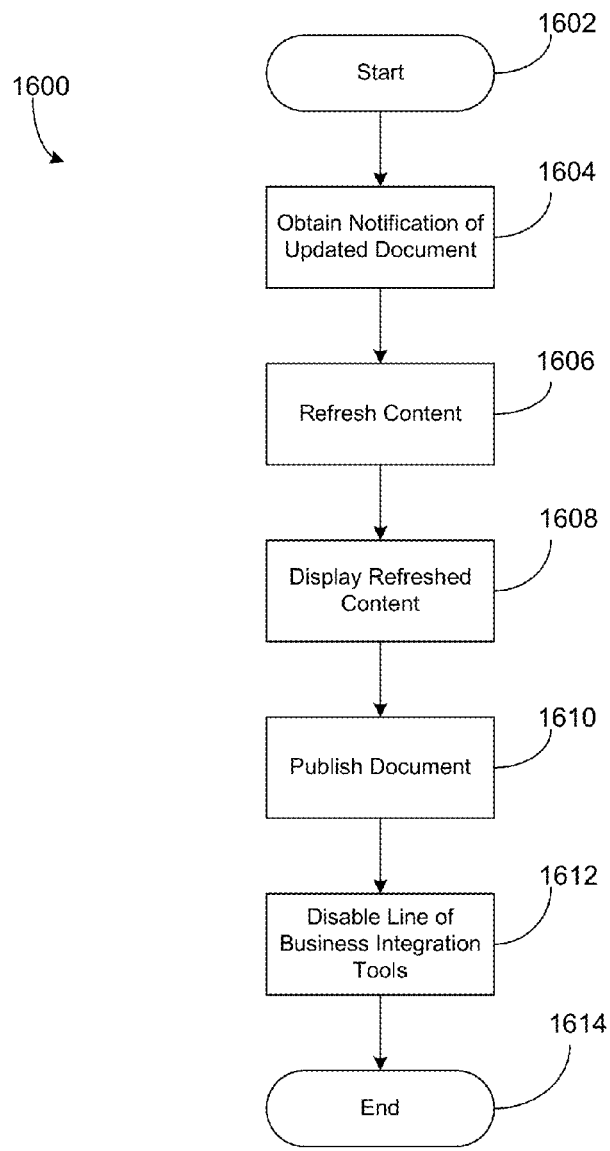
FIG. 16 represents an operational flow diagram for publishing a document associated with collaborative authoring.

FIG. 16 represents an operational flow diagram for publishing a document associated with collaborative authoring. Operational flow 1600 may represent operations associated with an editor after the editor has received a notification that the status of one or more sections has changed. Operational flow 1600 begins at start operation 1602 and continues to operation 1604 where a status update notification is obtained. At operation 1606, the content is refreshed and the updated content is displayed in the document as indicated by operation 1608. At operation 1610, the document is published and at operation 1612 the line of integration tools are disabled. Operation flow 1600 continues to end operation 1614.

As set forth herein, the integrated collaborative user interface allows multiple authors to edit the content of different sections of the same document in parallel. The changes may be submitted at any time and the changes may be received by one or more of the authors. The integrated collaborative interface provides custom actions for starting and managing collaborative authoring. An editor may assign various sections of the document to various authors. The integrated collaborative user interface allows authors to see and modify the structures of a document. Properties may also be modified. Sections of the document may further be reassigned after they have been started. In other aspects, an author may see the status of sections assigned to other authors. Integrated collaborative user interfaces also provide context-relevant notifications. An editor has the ability to shut down collaboration at any time to stop further access to a document. Authors also have the ability to work offline when documents are cached on the computing device of the author. As such, an integrated collaborative user interface provides increased authoring productivity.

Referring to FIG. 17, an exemplary system for implementing the invention includes a computing device, such as computing device 1700. In a basic configuration, computing device 1700 may include any type of stationary computing device or a mobile computing device. Computing device 1700 typically includes at least one processing unit 1702 and system memory 1704. Depending on the exact configuration and type of computing device, system memory 1704 may be volatile (such as RAM), non-volatile (such as ROM, flash memory, and the like) or some combination of the two. System memory 1704 typically includes operating system 1705, one or more applications 1706, and may include program data 1707. In one embodiment, applications 1706 further include application 1720 for mail distribution. This basic configuration is illustrated in FIG. 17 by those components within dashed line 1708.

Computing device 1700 may also have additional features or functionality. For example, computing device 1700 may also include additional data storage devices (removable and/or non-removable) such as, for example, magnetic disks, optical disks, or tape. Such additional storage is illustrated in FIG. 17 by removable storage 1709 and non-removable storage 1710. Computer storage media may include volatile and non-volatile, removable and non-removable media implemented in any method or technology for storage of information, such as computer readable instructions, data structures, program modules or other data. System memory 1704, removable storage 1709 and non-removable storage 1710 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1700. Any such computer storage media may be part of device 1700. Computing device 1700 may also have input device(s) 1712 such as a keyboard, mouse, pen, voice input device, touch input device, etc. Output device(s) 1714 such as a display, speakers, printer, etc. may also be included.

Computing device 1700 also contains communication connection(s) 1716 that allow the device to communicate with other computing devices 1718, such as over a network or a wireless network. Communication connection(s) 1716 is an example of communication media. Communication media typically embodies computer readable instructions, data structures, program modules or other data in a modulated data signal such as a carrier wave or other transport mechanism and includes any information delivery media. The term "modulated data signal" may include a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The term computer readable media as used herein includes both storage media and communication media.

Although the invention has been described in language that is specific to structural features and/or methodological steps, it is to be understood that the invention defined in the appended claims is not necessarily limited to the specific features or steps described. Rather, the specific features and steps are disclosed as forms of implementing the claimed invention. Since many embodiments of the invention can be made without departing from the spirit and scope of the invention, the invention resides in the claims hereinafter appended.

What is claimed is:

1. A method for providing notifications to collaborators of a document, comprising:
    accessing a document, via a first device of a first user, that is accessible simultaneously by a plurality of devices of other users to collaborate on the document;
    associating, via a user interface on the first device of the first user, at least one other user with one or more sections of the document, wherein the at least one other user is allowed to edit the one or more sections via another device;
    displaying, in the user interface, a refresh control;
    in response to receiving a selection of the refresh control, requesting from the plurality of devices of the other users edits made to the document by the other users;
    in response to receiving the edits to the document made by the other users to the one or more sections associated with the at least one other user via the other device:
        updating the user interface to indicate a position in the document at which the at least one other user has focus in the document at the time of the selection of the refresh control,
        updating a status of authoring for the one or more sections associated with the at least one other user, wherein the status of authoring is automatically set for a given section in response to a given user making edits to the given section, and
        updating content in the document based on the edits made between the selection of the refresh control and a prior selection of the refresh control.

2. The method of claim 1, further comprising also sending the notification to the devices of the plurality of other users.

3. The method of claim 1, further comprising sending the notification as a context-relevant notification.

4. The method of claim 1, further comprising displaying information relating to the notification.

5. The method of claim 4, further comprising hiding the information from display of the document.

6. The method of claim 4, further comprising preventing a display of the information to at least one of the collaborators based on assigned permissions.

7. The method of claim 1, wherein the edits made to the document are from at least one of the collaborators that is offline.

8. A system for providing notifications to collaborators of a document, the system comprising:
    a first computing device comprising:
        a processor;
        a display;
        a document editor program that includes collaborative authoring functionality for collaboration and communication on the document; and
        a memory having computer-executable instructions stored thereon, the instructions being configured to:
            access the document, via a user interface of the document editor program, by a first user, that is accessible simultaneously by a plurality of other users to collaborate on the document via other computing devices;
            associate a second user with one or more sections of the document, wherein the second user is allowed to edit the one or more sections via a second computing device;
            display, in the user interface, a refresh control;
            receive, at the user interface, a notification indicating the status has changed for at least one of the one or more sections that were edited by the second user; and
            in response to receiving a selection of the refresh control, request, from the second computing device, modifications made to the one or more sections that were edited by the second user;
            in response to receiving the modifications:
                update the user interface to indicate a position in the document that the second user has focus in the document at the time of the selection of the refresh control,
                update a status of authoring for the one or more sections associated with the second user, wherein the status of authoring is automatically set for a given section in response to a given user making edits to the given section, and
                update content in the document based on the modifications made since a prior selection of the refresh control.

9. The system of claim 8, further comprising also sending the notification to the other computing devices of the plurality of other users.

10. The system of claim 8, further comprising sending the notification as a context-relevant notification.

11. The system of claim 8, further comprising displaying information relating to the notification.

12. The system of claim 11, further comprising hiding the information from display of the document.

13. The system of claim 12, further comprising preventing a display of the information to at least one of the collaborators based on assigned permissions.

14. The system of claim 8, wherein the edits made to the document are from at least one of the collaborators that is offline.

15. A memory storage device having computer instructions thereon that when executed by a processor enable the processor to provide notifications to collaborators of a document, wherein the instructions enable the processor to execute steps comprising:
    accessing a document, via a first device of a first user, that is accessible simultaneously by a plurality of devices of other users to collaborate on the document;
    associating, via a user interface on the first device of the first user, at least one other user with one or more sections of the document, wherein the at least one other user is allowed to edit the one or more sections via at least one other device;
    displaying, in the user interface, a refresh control;
    receiving and displaying, at the user interface, a notification indicating at the least one other user has made edits to the document that are not reflected on the first device;
    in response to receiving a selection of the refresh control, requesting from the at least one other device the edits that have been made to the document by the at least one other user since a prior selection of the refresh control;

in response to receiving the edits to the document made by the at least one other user to the one or more sections associated with the at least one other user via the at least one other device:
- updating the user interface to indicate a position in the document at which the at least one other user has focus in the document at the time of the selection of the refresh control,
- updating a status of authoring for the one or more sections associated with the at least one other user, wherein the status of authoring is automatically set for a given section in response to a given user making edits to the given section, and
- updating content in the document based on the edits made between the selection of the refresh control and the prior selection of the refresh control to thereby reflect the edits on the first device.

16. The memory storage device of claim 15, wherein the instructions further enable the processor to execute additional steps comprising: sending the notification to the devices of the plurality of other users.

17. The memory storage device of claim 15, wherein sending the notification comprises sending a context-relevant notification.

18. The memory storage device of claim 15, wherein the instructions further enable the processor to execute additional steps comprising: displaying information relating to the notification.

19. The memory storage device of claim 18, wherein the instructions further enable the processor to execute further steps comprising: hiding the information from display of the document.

20. The memory storage device of claim 18, wherein the instructions further enable the processor to execute further steps comprising: preventing a display of the information to at least one of the collaborators based on assigned permissions.

* * * * *